United States Patent [19]
Durvasula et al.

[11] Patent Number: 5,870,676
[45] Date of Patent: Feb. 9, 1999

[54] METHOD AND APPARATUS FOR MONITORING KILLER CHANNELS IN A CELLULAR SYSTEM

[75] Inventors: Bhanu Durvasula, Gaithersburg; Srikanth Yaragudipati, Germantown, both of Md.

[73] Assignee: Hughes Electronics Corporation, El Segundo, Calif.

[21] Appl. No.: 603,052

[22] Filed: Feb. 16, 1996

[51] Int. Cl.[6] ................................................. H04Q 7/20
[52] U.S. Cl. .......................................... 455/450; 455/453
[58] Field of Search ................................... 455/450, 464, 455/453

[56] References Cited

U.S. PATENT DOCUMENTS

| | | | |
|---|---|---|---|
| 5,203,012 | 4/1993 | Patsiokas et al. | 455/550 |
| 5,280,630 | 1/1994 | Wang | 455/453 |
| 5,287,544 | 2/1994 | Menich et al. | 455/450 |
| 5,347,056 | 9/1994 | Rautiola | 455/453 |
| 5,418,839 | 5/1995 | Knuth | 455/464 |
| 5,478,868 | 12/1995 | Duque-Anton et al. | 455/453 |
| 5,561,847 | 10/1996 | Kataoka | 455/450 |
| 5,603,082 | 2/1997 | Hamabe | 455/450 |
| 5,666,654 | 9/1997 | Kanai | 455/450 |

*Primary Examiner*—Dwayne D. Bost
*Assistant Examiner*—Tracy M. Legree
*Attorney, Agent, or Firm*—John T. Whelan; Michael W. Sales

[57] ABSTRACT

Methods and apparatus for monitoring problematic transmission channels in a cellular telephone system are disclosed. In the preferred embodiment, the channel monitoring method or apparatus keeps track of a defined number of calls M. After channel selection, the channel monitoring process determines whether the channel assignment was successful. The number of calls M defines the window in which the process tracks channel failures. The disclosed monitoring process can be used in either an analog embodiment or a time division multiple access (TDMA) digital embodiment having multiple channels for each frequency, such as TDMA-3. After every frequency selection, whether call assignment is successful or unsuccessful, channel information is monitored. If the monitored channel information exceeds placement thresholds, the selected frequency is placed into an alarm subpool. Preferably, the channel monitoring process has at least one alarm subpool. If the selected channel has been previously placed into an alarm subpool during a window of calls M and the channel information satisfies rejection thresholds, the selected frequency is rejected. A rejected frequency is subsequently unavailable for future calls until the operator intervenes. If the selected frequency is already in an alarm subpool and there have been no call failures of the type which originally caused the selected frequency to be placed into an alarm subpool during the last M calls; the frequency is removed from the alarm subpool.

23 Claims, 6 Drawing Sheets

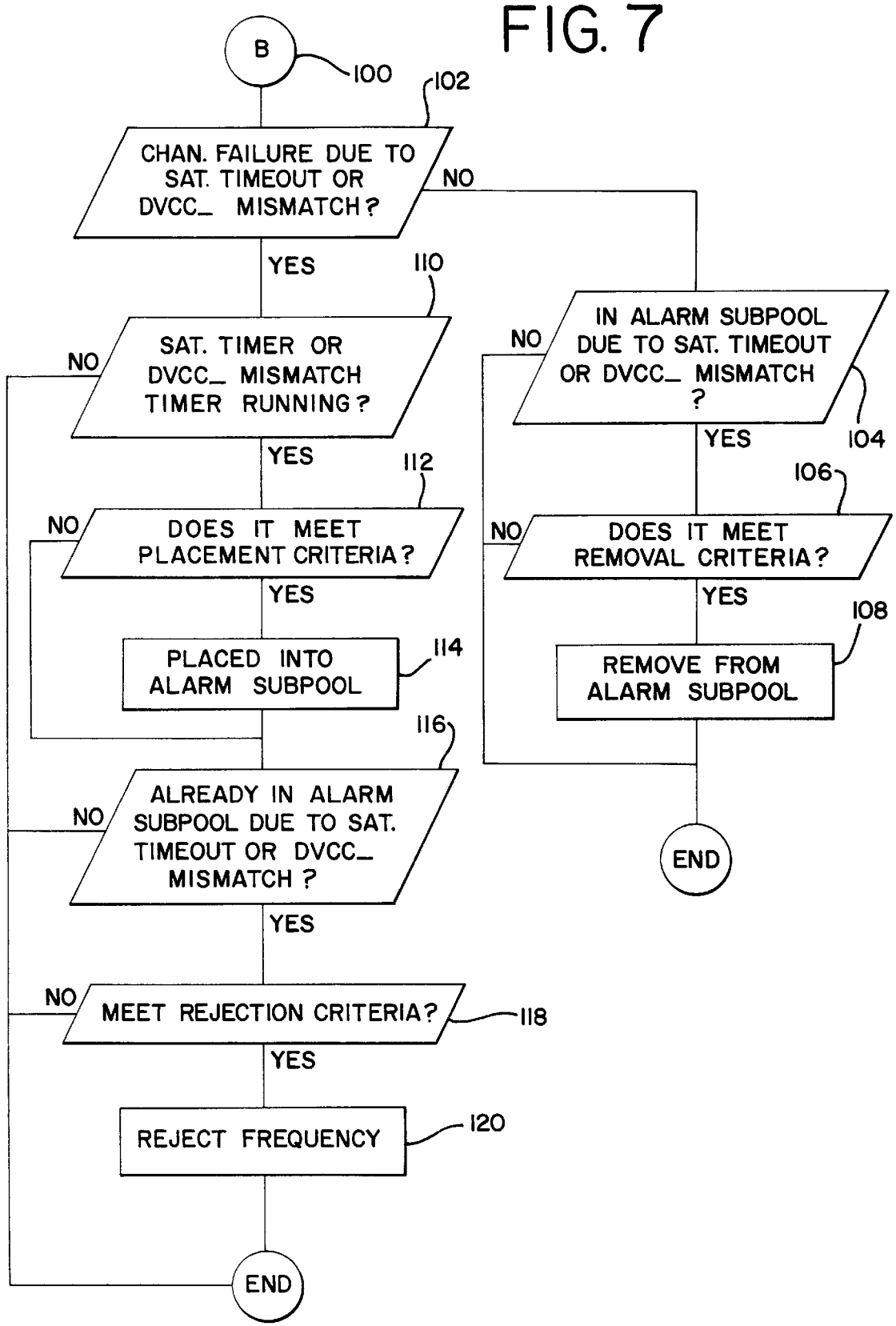

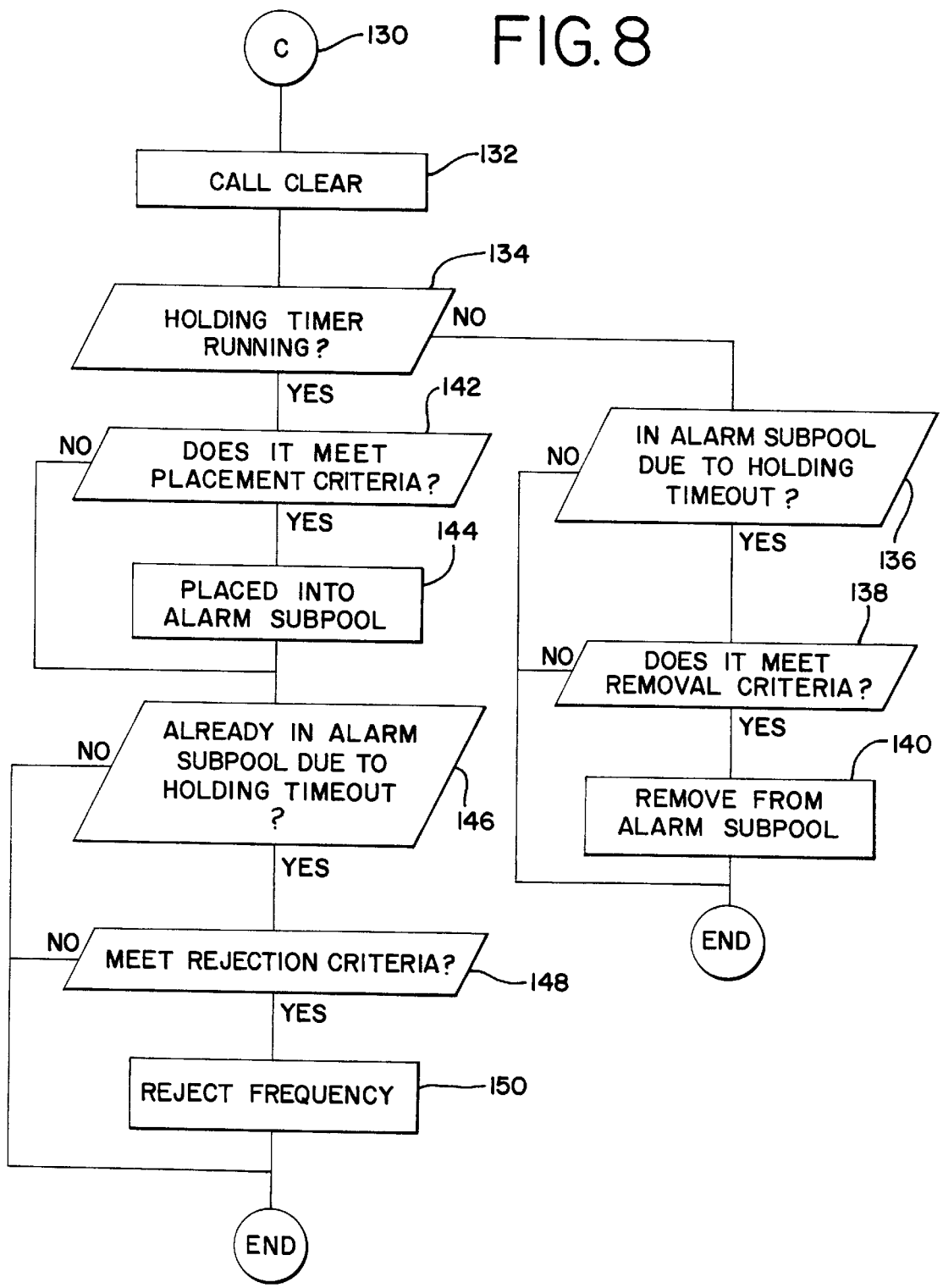

METHOD AND APPARATUS FOR MONITORING KILLER CHANNELS IN A CELLULAR SYSTEM

BACKGROUND OF THE INVENTION

Transmission channels in a cellular telephone system are typically selected using a sequential channel selection process. During operation, channels may be allocated by first creating a list of potential channels, then sequentially selecting channels from the created list. The list is usually arranged as an ordered list, for example, a priority que arrangement or a table. The channel selection protocol usually starts by selecting the first channel and determining if the selected channel is available to be assigned for transmission. If the first channel is available, it is selected for transmission. If the first channel is not available, the second channel's availability is checked. This process is repeated until an available channel is found, or until all of the channels in the list have been checked.

The above-described allocation method does not take the signal's quality or historical failure rates into account when selecting a channel. In general, channels having a higher signal quality level transmit voice and other information with better clarity and overall performance than channels having a lower signal quality level. Also, channels having high historical failure rates have a greater probability of failure. Further, when using a sequential channel selection protocol, channels at the head of the que tend to be selected much more often than channels near the end of the que. The result is that transmission circuits associated with the first few channels wear out from overuse more quickly than other transmission circuits.

A method and apparatus for allocating transmission channels in a cellular system based on channel quality but not historical failure rates is disclosed in a related application entitled Method and Apparatus for Allocating Channels in a Cellular System, Ser. No. 08/373,927 (Inventor: Bhanu Durvasula). That invention provides a method and apparatus for allocating channels in a cellular system by selecting transmission channels based only on a measured signal quality level of each channel. The method for allocating channels includes the steps of providing transmission channels suitable for transmission over a cell of the cellular system, defining a quality channel pool having a range of acceptable signal quality levels, measuring the signal quality level for each channel, and placing into the quality channel pool each channel having a signal quality level within the acceptable range. Channels are preferably selected from a round robin selection technique.

Although the above-described invention creates a hierarchy of preferred channels based on calculated signal qualities and increases the useful life of channel transmission circuitry, there is still need for even further improvement. For example, there is a need for a method that takes into consideration during channel selection the historical failure rates of a high quality channel. This would avoid the problem of calls being assigned to high quality but historically problematic channels only to have the calls disconnected, or connected with a poor quality of service. There is a further need for a channel allocation scheme that allows the operator to monitor the most problematic channels after each channel assignment. There is an even further need for a method whereby channels possessing the highest quality signals do not remain in their respective quality subpools even if they possess a history of pre-assignment and/or post-assignment failures. There is still further need of a mechanism to assign problematic channels a lower allocation priority even if their signal quality is high, whereby an operator could eliminate highly problematic channels from subsequent channel assignments, rectify the problematic area, then place the channel back into a quality subpool for future assignment.

SUMMARY OF THE INVENTION

The present invention is a traffic channel monitoring process and device that monitors each selected frequency, analyzes the failure histories of each selected frequency both before and after channel assignment even if channel assignment is not successful, creates at least one alarm subpool, places failed channels into at least one alarm subpool, removes failed channels from an alarm subpool if threshold removal criteria is satisfied, and rejects problematic channels that exceed threshold criteria from possible future assignment subpools. In the preferred embodiment, the channel monitoring process keeps track of a defined number of calls M. The number of calls M define the window in which the process tracks channel failures. These advantages are achieved with a monitoring process that can be used in either an analog embodiment or a time division multiple access (TDMA) digital embodiment having multiple channels for each frequency, such as TDMA-3.

The analog or digital channel monitoring method and apparatus selects a frequency for channel assignment. Preferably, the present invention uses the method and apparatus for channel selection and allocation disclosed in related patent application Ser. No. 08/373,927 Method and Apparatus for Allocation Channels in a Cellular System. In a digital embodiment having multiple channels for each frequency, the channel allocation process preferably selects partially packed frequencies before allocating a channel to an empty frequency. Preferably, the signal quality values are receive-signal-strength-indication (RSSI) values. After channel selection, the channel monitoring process determines whether the channel assignment was successful.

After every frequency selection, whether call assignment is successful or unsuccessful, channel information is monitored. If the monitored channel information exceeds placement thresholds, the selected frequency is placed into an alarm subpool. Preferably, the channel monitoring process has one alarm subpool. Alternatively, the channel monitoring process has a plurality of alarm subpools.

If the selected channel is placed into an alarm subpool during a previous window of M assigned calls, and if the channel information satisfies rejection thresholds, the selected frequency is rejected. A rejected frequency is unavailable for future calls until the operator intervenes. A controllable state is required for the frequency to be placed back into an appropriate allocation pool. If the selected frequency is already in an alarm subpool and there are no call failures of the type which originally caused the selected frequency to be placed into an alarm subpool during the previous M assigned calls, the frequency is removed from the alarm subpool. Preferably, the removed frequency is placed into a quality subpool determined by the frequency's signal strength.

These and other features and advantages of the present invention will be apparent to those skilled in the art from the following detailed description, taken together with the accompanying drawings, in which like reference numerals refer to like parts.

BRIEF DESCRIPTION OF THE DRAWINGS

FIG. 7 is a flowchart showing a monitoring subroutine of the channel monitoring process shown in FIG. 5 for a SAT_TIMEOUT failure or DVCC_MISMATCH failure; and FIG. 8 is a flowchart showing a monitoring subroutine of the channel monitoring process shown in FIG. 5 for a HOLDING_TIMEOUT failure.

DETAILED DESCRIPTION OF THE INVENTION

Figure 1:
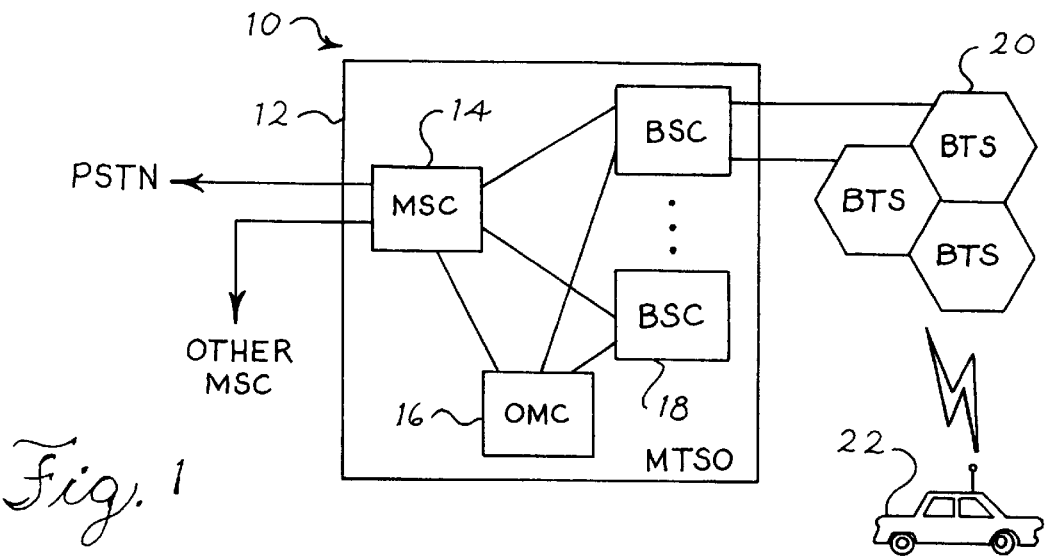
FIG. 1 is a block diagram of a digital network capable of utilizing the channel monitoring scheme of the present invention.

FIG. 1 is a block diagram of a digital cellular network 10. The digital cellular network 10 includes a mobile telephone switching office (MTSO) 12. The MTSO 12 includes a mobile switching center (MSC) 14, an operation and maintenance center (OMC) 16, and a plurality of base station controllers (BSCs) 18. The MTSO 12 is in communication with the public switched telephone network (PSTN) and other mobile switching centers. The MSC 14 is in communication with the OMC 16, and is also in communication with at least one BSC 18. The BSC 18 is connected through a communication channel to one or more base transceiver stations (BTS) 20. Each BTS 20 communicates over an RF frequency with a mobile subscriber 22.

A telephone "call" may be originated from the mobile subscriber 22 by transmitting initialization data over an RF control frequency assigned to a cell nearest the mobile subscriber 22. The call is transmitted via the RF frequency to the BTS 20 assigned to the cell servicing the subscriber 22. From the BTS 20, the call is routed to the BSC 18, and then to the MSC 14. From the MSC 14, the call is routed outside of the MTSO 12 to either another MSC or the PSTN. Thereafter, a communication channel is established through the entire digital cellular network 10, and the subscriber 22 may communicate over the established communication channel.

Calls may also originate from either another MSC or from the PSTN. Such a call enters the system 10 at the MSC 14, and is routed to one of the BSCs 18. The BSC 18 then pages the mobile subscriber 22 via the appropriate BTS 20. After the mobile subscriber 22 responds to the page from the BTS 20, a communication channel is established.

Figure 2:
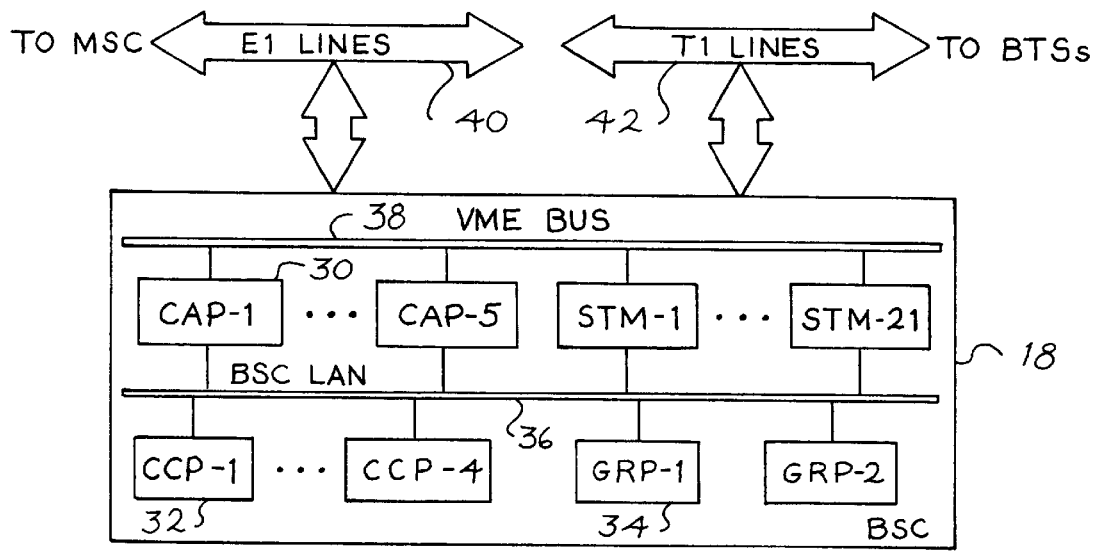
FIG. 2 is a block diagram of a base station controller of FIG. 1.

FIG. 2 illustrates a preferred component layout for the BSC 18. The BSC 18 communicates with the MSC 14 over E1 transmission lines 40, and communicates with the BTS 20 over T1 transmission lines 42. The BSC 18 has several processors including a call control processor (CCP) 32, a global resource processor (GRP) 34, and a channel access processor (CAP) 30. The BSC 18 also includes a BSC local area network (LAN) 36 and a VME bus 38. The VME bus 38 is used to communicate between the various CAPs 30, while the LAN 36 allows communication between the CCPs 32.

Each processor (30, 32, and 34) shown in FIG. 2 is preferably a 32 bit microprocessor such as an Intel 960. The processors (30, 32, and 34) are preferably operated with a multitasking software operating system such as UNIX or, most preferably, the VX WORKS operating system available from Wind River Systems.

Each processor (30, 32, and 34) is typically programmed with application software and communication software. Preferably, such software is written in C language. Preferably, each of the processors (30, 32, and 34) communicate with the other processors using either the BSC LAN 36 or the VME bus 38. Preferably, the processors (30, 32, and 34) communicate with each other using a network configuration and communication techniques well-known in the art.

Calls originating from the mobile subscriber 22 are received over the T1 line 42 and processed by the GRP 34. The GRP 34 then determines, based on loading conditions, which CCP 32 should handle the call. The call is then handed off to the selected CCP 32 assigned to the call. The CCP 32 then determines which CAP 30 should be used.

In the case of a call terminating to a mobile subscriber 22, the call originates from the MSC 14 over an E1 line 40 and is then routed to a GRP 34. The GRP allocates a CCP 32, which then allocates a CAP 30.

Figure 3:
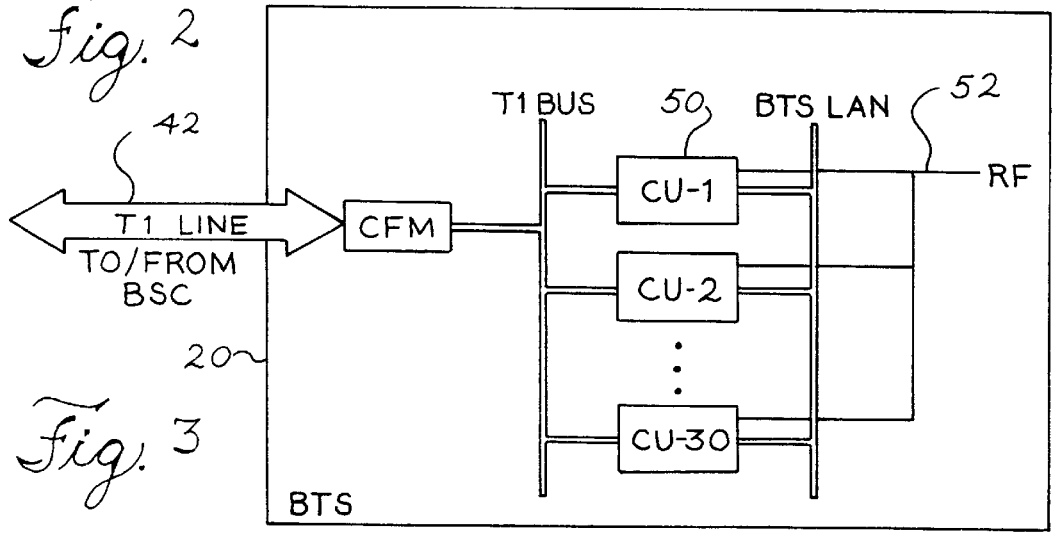
FIG. 3 is a block diagram of the base transceiver station of FIG. 2.

FIG. 3 illustrates a block diagram of a preferred component layout for the BTS 20. The BTS 20 communicates with the BSC 18 over T1 communication lines 42. A channel unit (CU) 50 receives data from the T1 lines 42 and generates an analog signal to be sent over an RF communication line 52. The RF communication line 52 is used to communicate with the mobile subscriber 22 over a cell (not shown).

The CU 50 is preferably either an analog channel unit, a dual mode channel unit, or a digital channel unit. Each CU 50 contains a plurality of communication channels available for transmissions. These channels may be analog control channels, analog traffic channels, digital traffic channels, analog scanning receiver channels, or digital scanning receiver channels. Analog control channels are used to communicate between the BTS 20 and the mobile unit 22 before the mobile unit 22 has been assigned a voice channel for communication. An analog traffic channel may be used for voice communication between the BTS 20 and the mobile subscriber 22. Each analog traffic channel is associated with a specific predefined frequency used for radio transmission over the RF communication link 52. Alternatively, in a digital communication system, a digital traffic channel may be used instead of the analog traffic channel. In a preferred TDMA-3 embodiment, each frequency contains three slot pairs and each slot pair is associated with a transmission channel. The allocation of frequencies to traffic channels is defined in detail by U.S. Cellular Standard IS-54.

Each CU 50 includes its own processor, such as an Intel 960 32-bit microprocessor unit, along with a hardware circuit for transmitting information over each of the channels. Each CU 50 communicates with other CUs 50 in the same BTS 20 over the BTS LAN 36.

Figure 4:
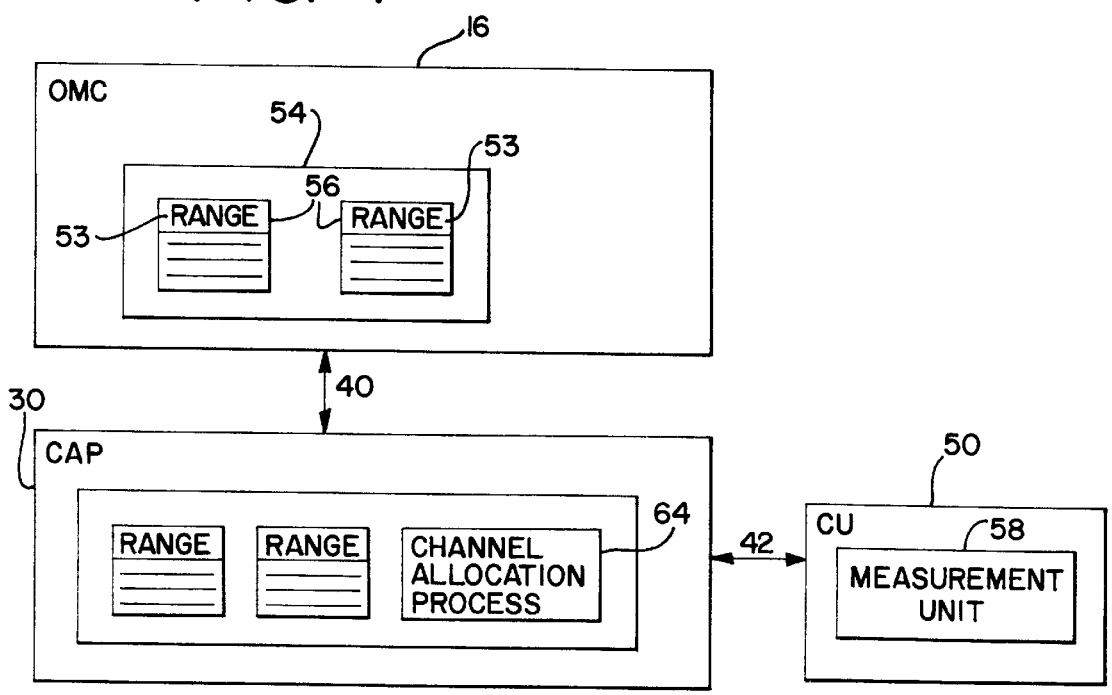
FIG. 4 is a block diagram of the operation and maintenance center, channel access processor, and channel unit, all of which are shown in FIGS. 1–3.

FIG. 4 illustrates a configuration database 54 of the OMC 16. The database 54 includes one or more quality channel pools 56. The OMC 16 communicates with a CAP 30 over the E1 transmission line 40. The CAP 30 includes a channel allocation process 64 and is in communication with a CU 50 over a T1 transmission line 42. The CU 50 preferably contains a signal quality measurement unit 58.

The configuration database 54 is operator-configurable and includes information on the various connections between the MSC 14 and the BSC 18, and components within the BSC 18, such as CAPs 30, CCPs 32, and GRPs 34. The database 54 also includes data representing various connections between ports within each CU 50 that may be used for transmission over a cell and a corresponding CAP 30. Thus, the database 54 preferably contains a data representation of the entire digital cellular network 10.

According to a presently preferred embodiment, the configuration database 54 includes at least one quality channel pool 56. The preferred quality channel pool 56 is created by defining a range of acceptable signal quality values 53, and assigning the range 53 to a quality channel pool index within the configuration database 54. Preferably, the signal quality values are receive-signal-strength-identification (RSSI) values. RSSI values are based on the well known commercial U.S. Cellular Standard IS-54.

An operator may create a single pool or multiple pools. Each pool 56 preferably has a distinct non-overlapping range of signal quality values 53.

After at least one channel quality pool 56 has been created in the configuration database 54, the BSC LAN 36 downloads the channel quality pool 56 via the E1 transmission line 40 to the CAP 30. The CAP 30 periodically receives signal quality values, preferably RSSI values, which are measured by the measurement unit 58 in the CU 50. Such measurements are preferably performed for each channel that may be used for transmission over a cell. The CAP 30 receives the signal quality values from the CU 50 over the T1 transmission line 42. The CAP 30 then compares each channel (e.g. C1–C6) to the range 53 of each pool 56 and, based on this comparison, decides whether to place a particular channel into a channel quality pool 56. A channel may be placed in a pool 56 by storing an index number associated with the channel into a memory location associated with the quality channel pool 56. After all of the channels are placed in a channel quality pool 56, the CAP 30 may then begin to allocate channels using the channel allocation processor 64.

Figure 5:
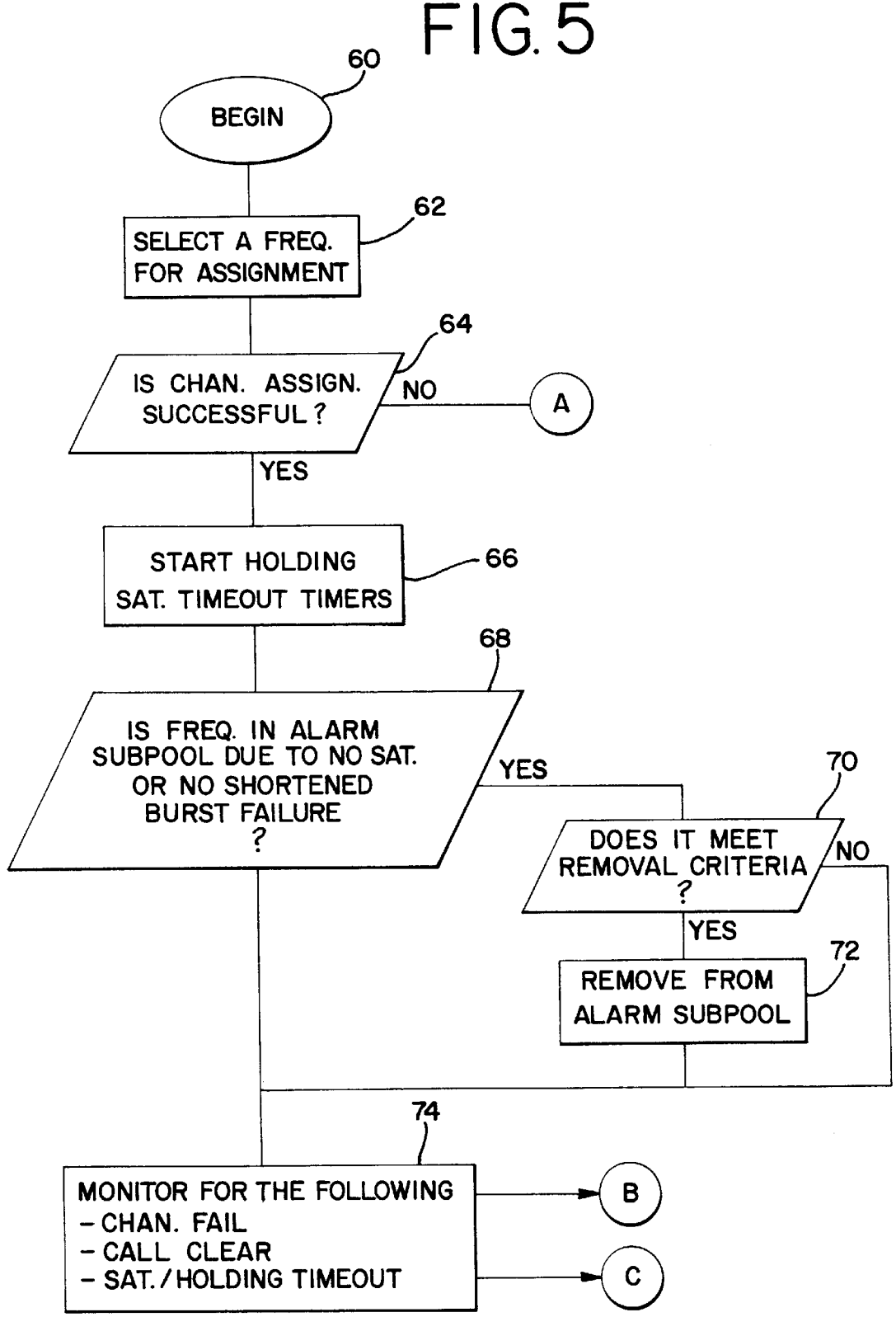
FIG. 5 is a high-level flowchart of a channel monitoring process embodying the present invention and executed by the channel access processor shown in FIGS. 2 and 4.

FIG. 5 is a high-level flowchart illustrating a channel monitoring process to a presently preferred embodiment of the invention and executed by the channel access processor 64. The channel monitoring process 60 can be either an analog or a time division multiple access (TDMA) digital embodiment having multiple channels for each frequency, such as TDMA-3.

According to FIG. 5, the analog or digital channel monitoring process 60 selects a frequency for channel assignment 62. Preferably, the present invention uses the method and apparatus for channel selection and allocation disclosed in related patent application Ser. No. 08/373,927 Method and Apparatus for Allocation Channels in a Cellular System. The method of allocating channels preferably includes the steps of providing a plurality of channels suitable for transmission over a cell of the cellular system, defining at least one quality channel pool having a range of acceptable signal quality levels, measuring the signal quality level for each channel, and placing each channel having a signal quality level within the acceptable range into a quality channel pool. A transmission channel is selected from the channels placed in the quality pools. Transmission channels are preferably selected from the pools using a round robin selection process so that each channel in the pool is selected approximately the same number of times as other channels in the pool. Also, in a digital embodiment having multiple channels for each frequency, the channel allocation process preferably selects partially packed frequencies before allocating a channel to an empty frequency. Preferably, the signal quality values are receive-signal-strength-indication (RSSI) values. RSSI values are based on the well known commercial U.S. Cellular Standard IS-54. After channel selection 62, the channel monitoring process 60 determines whether the channel assignment is successful 64. In the preferred embodiment, the channel monitoring process 60 keeps track of a number of calls, M, which defines the window size for which the process tracks channel failures. In other words, call information for each selected channel is maintained for the previous M successful or unsuccessful call assignments.

After every frequency selection, whether call assignment is successful or unsuccessful, channel information is monitored. In an alternative embodiment, channel information is monitored periodically. If the monitored channel information exceeds placement thresholds (i.e. X of M, Y of M or Z of M), the selected frequency is placed into an alarm subpool. Preferably, the channel monitoring process 60 has one alarm subpool.

If the selected frequency is placed into an alarm subpool during a previous window of M assigned calls and the channel information satisfies rejection thresholds (i.e. A, B or C), the selected frequency is rejected. A rejected frequency is subsequently unavailable for future calls until the operator intervenes. A controllable state is required for the frequency to be placed back into an appropriate allocation pool. If the selected frequency is already in an alarm subpool and there have been no call failures of the type which originally caused the selected frequency to be placed into an alarm subpool during the previous M assigned calls (i.e. O of M), the frequency is removed from the alarm subpool. Preferably, the removed frequency is placed into a quality subpool determined by the frequency's signal strength. In the preferred embodiment, there is no limit to the number of times a frequency is placed into an alarm subpool, removed from an alarm subpool and placed back into a quality subpool or rejected from possible assignment without operator intervention. In an alternative embodiment, these parameters are configured otherwise.

Figure 6:
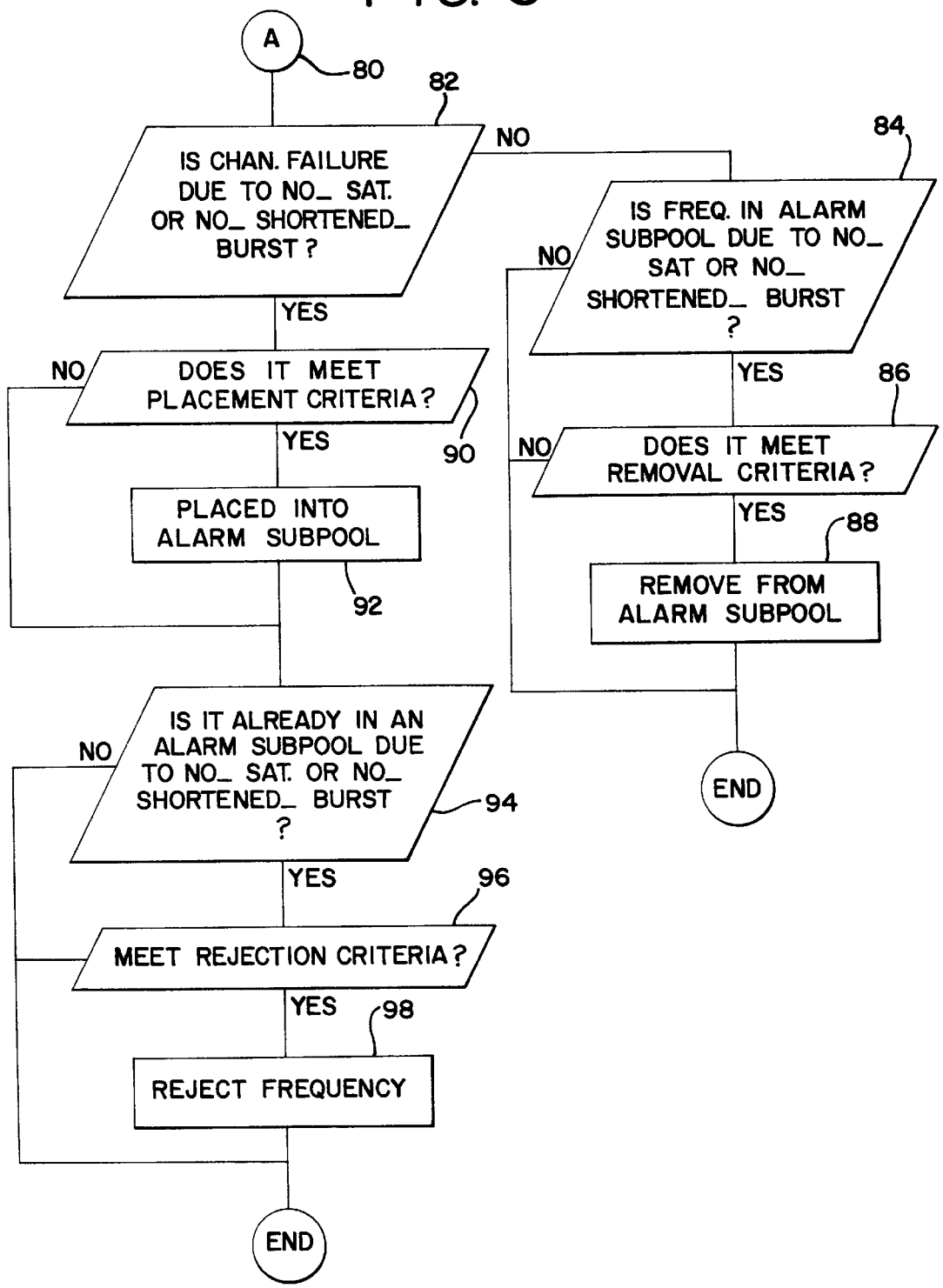
FIG. 6 is a flowchart showing a monitoring subroutine of the channel monitoring process shown in FIG. 5 if channel assignment is unsuccessful due to a NO_SAT or NO_SHORTENED_BURST failure.

FIG. 6 illustrates a flowchart monitoring subroutine 80 of the channel monitoring process shown in FIG. 5 if channel assignment 64 is unsuccessful. First, the monitoring subroutine 80 inquires as to the type of channel assignment failure. In an analog system, the channel assignment failure detected is a NO_SAT 82 failure and in a TDMA system, the failure detected is a NO_SHORTENED_BURST 82 failure.

In an analog system, after a channel has been allocated by the channel allocation processor 64, a channel access processor (CAP) 30 sends a channel-allocation-complete message to the call control processor (CCP) 32 and sends a channel-activate-message to the channel unit (CU) 50. Upon receipt of the channel activate message, the CU 50 sends a supervisory audio tone (SAT) over the RF communication link 52 to the mobile subscriber 22. After the mobile subscriber 22 changes frequencies to the channel selected by the channel allocation processor 64, the mobile unit 22 sends a SAT back to the CU. A NO_SAT failure occurs when the CU 50 fails to receive the SAT from the mobile subscriber 22. A NO_SAT failure means the mobile 22 has never been seen on the traffic frequency.

In a digital embodiment, or preferably in a TDMA-3 embodiment, the monitoring subroutine 80 determines whether the failure is due to a NO_SHORTENED_BURST failure. In a TDMA network, after a channel is allocated for a call, the CAP 30 sends a channel allocation complete signal to the CCP 32. The CCP 32 then sends an Initial Voice Channel Designation (IVCD) signal to the mobile unit 22. The IVCD instructs the mobile 22 which traffic signal to switch to and instructs the mobile to burst onto the traffic frequency. The CAP 30 then determines whether it hears the burst from the mobile 22 signifying that the mobile 22 got onto the traffic frequency. A NO_SHORTENED_BURST failure occurs when the CAP 30 fails to receive such a burst signal from the mobile unit 22.

If the channel assignment failure is not due to a NO_SAT or NO_SHORTENED_BURST failure 82, the channel monitoring subroutine 80 determines whether the failed frequency satisfies removal criteria. Satisfaction of removal criteria removes a frequency previously placed into an alarm subpool from that subpool. First, the subroutine 80 determines whether the frequency is currently in an alarm subpool due to a previous assignment failure due to a NO_SAT or NO_SHORTENED_BURST failure 84.

If the frequency currently resides in an alarm subpool due to a previous NO_SAT or NO_SHORTENED_BURST failure, the channel monitoring process subroutine 80 determines whether the frequency satisfies the removal criteria 86. Preferably, the removal criteria 86 is configurable. Most preferably, the removal criteria 86 is operator configurable. In the preferred embodiment, the frequency is removed from an alarm subpool if it has experienced a low number of failures in the past M call assignments. Preferably, this low number is zero and the removal criteria 86 is represented as zero failures during the past M calls. If the removal criteria 86 is satisfied, the alarm subpool frequency is removed from the alarm subpool 88. System parameters are configurable to limit the number of times a frequency is removed from an alarm subpool.

In the preferred embodiment, the removed frequency is then placed back into a subpool based on signal quality strength. Preferably, as described in related patent application Ser. No. 08/373,927, at least one quality demand pool is created based on measured signal quality and channels are subsequently selected for transmission from the quality pools first. Preferably, frequencies placed in an alarm subpool have a lower priority than those frequencies in the quality demand pools. In an alternative embodiment, alarm subpool frequencies are immediately rejected from future call assignments. If the removal criteria 86 is not satisfied, the alarm subpool frequency remains in the alarm subpool.

If the call assignment failure is due to a NO_SAT or a NO_SHORTENED_BURST failure, the channel monitoring subroutine 80 inquires as to whether the selected frequency has experienced an unacceptable history of NO_SAT or NO_SHORTENED_BURST failures. An unacceptable history of failures is defined by placement criteria 90. Preferably, the placement criteria 90 is configurable. Most preferably, the placement criteria 90 is operator configurable. The X of M placement criteria 90 defines the number of call failures occurring during a number of M assignments to a specific frequency due to a NO_SAT or a NO_SHORTENED_BURST failure. If the X of M placement criteria 90 is satisfied, the failed frequency is defined as problematic and placed into an alarm subpool 92. In the preferred embodiment, a frequency residing in an alarm subpool does not indicate that it is unassignable. Rather, it merely indicates that alarm subpool frequencies have the lowest priorities at the call assignment stage 62.

If the placement criteria 90 is not satisfied or alternatively, if the placement criteria 90 is satisfied and the frequency is consequently placed into an alarm subpool 92, the channel monitoring subroutine 80 determines whether the frequency is already in an alarm subpool due to a previous NO_SAT or NO_SHORTENED_BURST failure 94. If the frequency is already in an alarm subpool, the preferred monitoring subroutine 80 inquires as to whether the frequency is rejected based on rejection criteria 96. The frequency is rejected if a predetermined number of assignments over the past M calls have been unsuccessful due to NO_SAT or NO_SHORTENED_BURST failures. In the preferred embodiment, this rejection criteria 96 is defined as the A criteria 90 and is configurable. Most preferably, the rejection criteria 90 is operator configurable. System parameters are configurable to limit the number of times a frequency is rejected. A rejected frequency is removed from service and the operator notified. Future channel assignments using this rejected frequency occur only if the problem causing the unsuccessful assignments is rectified.

Returning to the high-level flowchart illustrated in FIG. 5, if channel assignment 64 is successful, the monitoring process 60 starts HOLDING timer and SAT_TIMEOUT/DVCC_MISMATCH timer 66. In an analog system, a successful assignment means that the system actually saw the SAT and the mobile 22 got on the traffic frequency. In a TDMA-3 system, a successful assignment means that the system actually received a shortened burst and the mobile 22 got on the traffic frequency.

The holding timer is started when a channel is allocated for a call. The number of ticks for HOLDING_TIMEOUT is configurable and determines the value of the holding timer. After the mobile 22 gets on the traffic frequency, a SAT is received by the CAP 30. A SAT_TIMEOUT failure occurs if shortly after a SAT is received, the SAT is no longer received. Preferably, the threshold timeout timer expires five seconds after SAT is received. If a call is cleared before the timer expires, the preferred embodiment treats this occurrence as a failure and the call is consequently dropped or released.

After the timers are started 66, the monitoring process 60 shown in FIG. 5 inquires as to whether the selected frequency has already been placed into an alarm subpool due to a previous NO_SAT or NO_SHORTENED_BURST failure 68. If the selected frequency is currently in an alarm subpool due to a previous NO_SAT or NO_SHORTENED_BURST failure, the preferred process 60 inquires as to whether the removal criteria 70 is satisfied. As previously noted, the removal criteria 70 is the number of failures which have occurred during the past M calls 70. Preferably, the removal criteria 20 is configurable. Most preferably, the removal criteria 70 is operator configurable. In the preferred embodiment, an alarm subpool frequency is removed from the subpool 72 if no NO_SAT or NO_SHORTENED_BURST failures occur during the window of M assignments. If the removal criteria 70 is not satisfied or in the alternative, if the frequency is not in the alarm subpool due to a previous NO_SAT or NO_SHORTENED_BURST failure, the preferred process 60 monitors a plurality of other call cleared channel characteristics 74.

A plurality of call cleared channel characteristics are monitored via the disclosed channel monitoring method 60. In the preferred embodiment, monitored channel characteristics 74 include channel failure due to SAT_TIMEOUT or DVCC_MISMATCH and HOLDING_TIMEOUT.

FIG. 7 is a flowchart subroutine 100 illustrating the monitoring process 60 of the channel monitoring process shown in FIG. 5 for both SAT_TIMEOUT and DVCC_

MISMATCH channel characteristics if the call fails after successful channel assignment 40. First, the channel monitoring subroutine 100 determines whether the failure is due to a SAT_TIMEOUT or DVCC_MISMATCH failure 102. To verify that the mobile 22 is on the correct frequency, the SAT is checked if it is an analog call and the DVCC is checked if it is a digital call. For an analog call, if the periodically received SAT at the BTS 20 is incorrect, the call is declared a failure due to SAT_TIMEOUT. For a digital call, if the periodically received DVCC at the BTS 20 is incorrect, the call is declared a failure due to DVCC_MISMATCH.

If a call failure is not due to a SAT_TIMEOUT or DVCC_MISMATCH failure 102, the monitoring subroutine 100 determines if the frequency is currently in an alarm subpool due to a previous SAT_TIMEOUT or DVCC_MISMATCH failure 104. If the frequency is currently in an alarm subpool due to a previous SAT_TIMEOUT or DVCC_MISMATCH failure 104, the subroutine 100 determines whether the alarm subpool removal criteria 106 is satisfied. Preferably, the removal criteria 106 is configurable. Most preferably, the removal criteria 106 is operator configurable. If the removal criteria 106 is satisfied, the alarm subpool frequency is removed from the alarm subpool 108. In the preferred embodiment, the removed frequency is then placed into an appropriate subpool for assignment. Preferably, subpool placement is based on signal quality. Transmission channels are then selected from this pool based on a signal quality priority. Therefore, only channels having an acceptable quality are selected for transmission. As disclosed in related patent application Ser. No. 08/373,927, a round robin selection process is preferably used to spread usage approximately equally among the transmission channels, thereby reducing the cost of maintaining the corresponding hardware transmission unit.

If channel failure is due to a SAT_TIMEOUT or DVCC_MISMATCH, the subroutine 100 determines whether the SAT_TIMER or DVCC_MISMATCH timer is running 110. If the timer is still running, the subroutine 100 determines whether the placement criteria 112 is satisfied. Preferably, the placement criteria is defined as Y of M 112 where Y is the threshold number of failures required in an M window of calls. Preferably the placement criteria 112 is configurable and most preferably operator configurable. If the placement criteria 112 is satisfied, the frequency is placed into an alarm subpool 114. In the preferred embodiment, a frequency residing in an alarm subpool does not indicate that it is not assignable. Rather, it merely indicates that the frequencies placed into an alarm subpool have the lowest priorities at the call assignment stage 62.

If the placement criteria 112 is not satisfied, or in the alternative, if the placement criteria 112 is satisfied and the frequency is placed into an alarm pool 114, the monitoring subroutine 100 determines whether the frequency is already in an alarm subpool due to a SAT_TIMEOUT or DVCC_MISMATCH failure 116. If the frequency has already been placed into an alarm subpool, the subroutine 100 determines whether the frequency rejection criteria 118 is satisfied. If the rejection criteria 118 is satisfied, the frequency is rejected 120. Preferably, frequencies which satisfy the frequency rejection criteria 118 and are rejected are no longer available for assignment. A rejected frequency is one which remains unavailable for channel assignment unless the operator of the cellular system takes some action to rectify the problem causing the frequency to fail. System parameters may be configured to limit the number of times a frequency can be rejected. If the monitored channel problem information remains below the threshold rejection criteria 118 after being placed into an alarm subpool, the alarm subpool frequency remains assignable.

FIG. 8 is a monitoring flowchart 130 of the channel monitoring process 60 shown in FIG. 5 which illustrates a subroutine for HOLDING_TIMEOUT monitoring. Subroutine 130 monitors call release commands occurring after a call has been set up. A HOLDING_TIMEOUT failure occurs only after a call has been initially cleared 132. Once a successful call assignment takes place 64 and the call has cleared 132, subroutine 130 inquires as to whether the holding timer 66 is still running 134. If the holding timer 66 is no longer running, subroutine 130 determines whether the frequency is in an alarm subpool due to a previous HOLDING_TIMEOUT failure 136. If the frequency is currently in an alarm subpool due to a previous HOLDING_TIMEOUT failure 136, the monitoring subroutine 130 determines whether the removal criteria 138 is satisfied. In the preferred embodiment, the removal criteria 138 is defined as zero failures during the previous M call assignments. If the removal criteria 138 is satisfied, the frequency is removed from the alarm subpool 140. The removed frequency is placed back into a quality subpool based on channel quality. System parameters may be configured to limit the number of times a frequency can be removed from an alarm subpool. Preferably, frequencies which do not meet the removal criteria 138 remain assignable as long as the problems on the channel remain below the rejection parameters.

If the subroutine 130 determines that the holding timer 66 is still running 134, the subroutine 130 calculates whether the placement criteria 142 is satisfied. Preferably, the placement criteria 142 is configurable. Most preferably, the placement criteria 142 is user configurable and defined as Z of M. If the placement criteria 142 is satisfied, the frequency is placed into an alarm subpool 144. In the preferred embodiment, a frequency residing in an alarm subpool does not indicate that it is not assignable. Rather, it merely indicates that the frequencies placed into an alarm subpool have the lowest priorities at the call assignment stage 62.

If the placement criteria 144 is not satisfied or, in the alternative, if the placement criteria 144 is satisfied and the frequency is consequently placed into an alarm subpool 144, the subroutine 130 then determines whether the frequency is already in an alarm subpool due to a previous HOLDING_TIMEOUT failure 146. If the frequency is already in an alarm subpool due to a HOLDING_TIMEOUT failure, the subroutine 130 determines whether the rejection criteria 148 is satisfied.

Preferably, the HOLDING_TIMEOUT rejection criteria 148 is configurable. Most preferably, the HOLDING_TIMEOUT rejection criteria 148 is user configurable. If the rejection criteria 148 is satisfied, the frequency is rejected 150 and consequently rejected from any possible future assignments. The rejected frequency remains unassignable until the system operator rectifies the problem. System parameters may be configured to limit the number of times a frequency can be rejected.

The described method and apparatus of monitoring problem channels has several advantages. Because the disclosed methods and apparatus monitor placement, removal, and rejection parameters, they minimize the allocation of problematic channels having an unacceptable rate of failures. To increase system flexibility, the rate of failures is preferably configurable, and most preferably operator configurable. By monitoring a plurality of specific types of channel failures that a specific channel experiences over a window of call assignments M, the disclosed methods improve on previous channel selection methods. With previous channel selection methods, a problematic frequency having a high signal quality level would continually be assigned calls even if it had a history of failures. The problem of assigning a frequency with a history of failures is more pronounced if the channel is located at the beginning of a quality pool as it would invariably be picked first, therefore leading to a high rate of dropped calls. The preferred monitoring methods detect a channel which experiences a plurality of call failure types, places failed frequencies into a lower assignment priority alarm subpool, monitors the alarm subpool frequency for future failures, removes alarm subpool frequencies which no longer experience a threshold failure rate, and rejects those alarm subpool frequencies experiencing an unacceptable level of failure rates. In addition, the method minimizes the assignment of alarm subpool frequencies.

While several illustrative embodiments of the invention have been shown and described, numerous variations and alternative embodiments will occur to those skilled in the art. Such variations and alternate embodiments are contemplated, and can be made without departing from the spirit and scope of the invention as defined by the appended claims.

What is claimed is:

1. A method of monitoring channels in a cellular communications system comprising the following steps:
   receiving at a base station of the cellular communications system a request from a subscriber unit for assignment of one of a plurality of available transmission channels for use by said subscriber unit in establishing a communications link involving said subscriber unit;
   assigning a selected one of said plurality of transmission channels to said subscriber unit in response to said request; and
   determining a failure rate for said selected one of said plurality of transmission channels wherein said step of determining said failure rate includes the step of determining whether or not said assigning step resulted in said communications link actually being established for said subscriber unit.

2. The method of claim 1, wherein the step of determining said failure rate for said selected one of said plurality of transmission channels is performed after each channel is assigned.

3. The method of claim 1, wherein the step of assigning a selected one of said plurality of transmission channels is performed according to configurable criteria.

4. The method of claim 1, wherein the step of assigning a selected one of said plurality of transmission channels is performed based on signal quality strength.

5. The method of claim 1, wherein the step of determining whether or not said assigning step resulted in said communications link actually being established for said subscriber unit further includes identifying channel failure.

6. The method of claim 1, wherein the step of determining said failure rate further includes identifying channels which are problematic.

7. The method of claim 5, wherein the step of identifying channel failure occurs after each frequency is selected for assignment.

8. The method of claim 6, wherein the identified problematic channels cause a cleared call to fail.

9. The method of claim 1, wherein the step of determining a failure rate further includes identifying channels which cause a call assignment to fail.

10. The method of claim 1, wherein the step of determining a failure rate further includes identifying problematic channels by configurable criteria.

11. The method of claim 1, further comprising the step of prioritizing channels within alarm subpools.

12. The method of claim 11, wherein the step of determining a failure rate further comprises placing identified problem channels into at least one of the alarm subpools if the failure rate satisfies placement criteria.

13. The method of claim 11, wherein the step of determining a failure rate further comprises removing channels from an alarm subpool if the failure rate satisfies removal criteria.

14. The method of claim 13, wherein the removed channels are placed into assignment subpools based on signal quality levels.

15. The method of claim 11, wherein the step of determining a failure rate further includes the step of rejecting frequencies placed into an alarm subpool if the failure rate satisfies rejection criteria.

16. The method of claim 15, wherein the channels satisfying the rejection criteria are not assignable.

17. The method of claim 15, wherein the channels satisfying the rejection criteria are not assignable unless a stable state is reached.

18. The method of claim 1, further comprising the step of prioritizing channels within the alarm subpools according to signal quality.

19. The method of claim 1, further comprising the step of minimizing the assignment of problem channels to calls.

20. The method of claim 1, wherein said step of determining a failure rate further comprises monitoring channel assignments and tabulating a number of successful channel assignments and a number of unsuccessful channel assignments.

21. The method of claim 20 wherein said monitoring of said channel assignments comprises the use of an audio tone sent between a subscriber unit and a base station.

22. The method of claim 20 wherein said monitoring of said channel assignments comprises the use of data sent between a subscriber unit and a base station.

23. A method of monitoring channels in a cellular communications system comprising the following steps;
   receiving at a base station of the cellular communications system a request from a subscriber unit for assignment of one of a plurality of available transmission channels for use by said subscriber unit in establishing a communications link involving said subscriber unit;
   assigning a selected one of said plurality of transmission channel to said subscriber unit in response to said request;
   determining a failure rate for said selected one of said plurality of transmission channels wherein said failure rate is determined independently of whether there is any activity on said selected one of said plurality of transmission channels.

* * * * *